(12) United States Patent (10) Patent No.: US 12,618,781 B2

Martinez et al. (45) Date of Patent: May 5, 2026

(54) SYSTEM AND METHODS FOR DETECTING MATTRESS DEFECTS

(71) Applicant: Gumersindo Martinez, Centerton, AR (US)

(72) Inventors: Gumersindo Martinez, Centerton, AR (US); Daniel Esteban Viviani, Bath, PA (US)

(73) Assignee: Gumersindo Martinez, Centerton, AR (US)

( * ) Notice: Subject to any disclaimer, the term of this patent is extended or adjusted under 35 U.S.C. 154(b) by 0 days.

(21) Appl. No.: 19/197,417

(22) Filed: May 2, 2025

(65) Prior Publication Data

US 2025/0347630 A1 Nov. 13, 2025

Related U.S. Application Data

(60) Provisional application No. 63/643,742, filed on May 7, 2024.

(51) Int. Cl.
*G01N 21/88* (2006.01)
*G01B 11/22* (2006.01)
*H04N 23/51* (2023.01)

(52) U.S. Cl.
CPC ......... *G01N 21/8806* (2013.01); *G01B 11/22* (2013.01); *H04N 23/51* (2023.01)

(58) Field of Classification Search
CPC ..... G01N 21/8806; H04N 23/51; G01B 11/22
See application file for complete search history.

(56) References Cited

FOREIGN PATENT DOCUMENTS

| CN | 106197908 A | * | 12/2016 | ........... G01M 5/005 |
|----|----|----|----|----|
| CN | 107831175 A | * | 3/2018 | .......... G01N 21/898 |
| FR | 2548077 A1 | * | 1/1985 | .............. B26D 5/00 |
| JP | 2014172154 A | * | 9/2014 | .......... G01B 11/303 |

* cited by examiner

*Primary Examiner* — Tri T Ton

(74) *Attorney, Agent, or Firm* — Master Key IP, LLP; Justin G. Sanders

(57) ABSTRACT

A mattress defect detection system and associated methods are disclosed for analyzing a mattress for potential defects. In at least one embodiment, the system includes a mattress defect detection device and a user application residing in memory on a computing device in selective communication with the detection device. During use, with a guide rail of the detection device positioned over a top surface of the mattress, a control housing of the detection device is moved along the guide rail, while a measurement laser of the control housing measures a depression depth of a body depression in the top surface of the mattress at at least one measurement site, with the at least one depression depth subsequently being transmitted to the computing device, where the user application determines whether one or more of the at least one depression depth exceeds a pre-defined threshold, in which case the mattress is deemed defective.

20 Claims, 9 Drawing Sheets

SYSTEM AND METHODS FOR DETECTING MATTRESS DEFECTS

RELATED APPLICATIONS

This application claims priority and is entitled to the filing date of U.S. provisional application Ser. No. 63/643,742, filed on May 7, 2024. The contents of the aforementioned application are incorporated herein by reference.

BACKGROUND

The subject of this patent application relates generally to mattresses, and more particularly to a system and associated methods for accurately detecting defects in mattresses in a consistent and uniform manner.

Applicant hereby incorporates herein by reference any and all patents and published patent applications cited or referred to in this application.

By way of background, the process of testing a mattress for potential defects is traditionally conducted in a consumer's home by trained service technicians. There are currently two known methods of testing a mattress for potential defects. The first method involves the use of a string and a ruler or measuring tape. A technician stretches a length of string across the mattress either laterally or longitudinally, a distance above the mattress, with a weight on each end of the string to make it taut, then measures with a ruler or measuring tape the deepest depression they can find at any point in the mattress (i.e., measuring from the string to the top surface of the mattress at any given point). Depressions are solely found by the technician visually looking at the mattress, which is not accurate. The second method involves the technician positioning a straight edge (such as a level, a stick or a pipe, for example) on the top surface of the mattress, with the straight edge oriented either laterally or longitudinally relative to the mattress, then finding any depressions in the mattress (i.e., any spots along the underside of the straight edge where there is a gap between the bottom surface of the straight edge and the top surface of the mattress), then measuring those depressions with a ruler or a measuring tape (i.e., measuring from the bottom surface of the straight edge to the top surface of the mattress) to find the deepest depression. Neither of these known prior art methods are known to be foolproof or accurate. The technician may not visually see or find the deepest depression on the mattress, and therefore not measure it. Furthermore, the technician may and can push down with the measuring tape or ruler to artificially create a deeper depression in the mattress (either unintentionally, or intentionally committing fraud), or the device string or straight edge may not be placed correctly, creating a false depression. Either way, both known prior art methods rely on honesty and accuracy of the human technician performing the inspection, which means that these known prior art methods are incapable of being consistently and uniformly performed. Therefore, there remains a need for a system and associated methods for accurately detecting defects in mattresses in a consistent and uniform manner.

Aspects of the present invention fulfill these needs and provide further related advantages as described in the following summary.

It should be noted that the above background description includes information that may be useful in understanding aspects of the present invention. It is not an admission that any of the information provided herein is prior art or relevant to the presently claimed invention, or that any publication specifically or implicitly referenced is prior art.

SUMMARY

Aspects of the present invention teach certain benefits in construction and use which give rise to the exemplary advantages described below.

The present invention solves the problems described above by providing a system and associated methods for analyzing a mattress for potential defects. In at least one embodiment, the system includes an at least one mattress defect detection device and a user application residing in memory on an at least one computing device, the at least one computing device in selective communication with the at least one mattress defect detection device and configured for receiving and processing select data related to the mattress, obtained by at least one mattress defect detection device. In at least one embodiment, the at least one mattress defect detection device provides an elongate guide rail sized and configured for being oriented laterally or longitudinally relative to the mattress, in a substantially horizontal orientation and parallel with a top surface of the mattress. A pair of support legs are configured for engagement with the guide rail in order to elevate the guide rail a substantially uniform distance above the top surface of the mattress, thereby vertically spacing apart the guide rail and the top surface of the mattress. Each of the support legs provides a support foot configured for being placed on a substantially horizontal surface. A control housing is slidably engaged with the guide rail and capable of selectively traversing a rail length of the guide rail between a first terminal end and an opposing second terminal end of the guide rail. The control housing provides an at least one measurement laser positioned and configured for measuring a depression depth of a body depression in the top surface of the mattress at an at least one measurement site, the at least one measurement laser oriented so as to emit a laser beam toward the top surface of the mattress in a direction that is substantially perpendicular to the top surface of the mattress. The control housing further provides an at least one microcontroller in electrical communication with the at least one measurement laser for controlling and receiving select data from the at least one measurement laser. During use of the system, with the guide rail positioned over the top surface of the mattress, the control housing is moved along the guide rail between the first and second terminal ends, while the at least one measurement laser measures the depression depth of the body depression in the top surface of the mattress at each of the at least one measurement site, with the at least one depression depth measurement being subsequently transmitted to the at least one computing device, where the user application determines whether one or more of the at least one body depression has a depression depth that exceeds a pre-defined threshold, in which case the user application determines that the mattress is defective.

In at least one embodiment, an exemplary method for analyzing a mattress for potential defects using the exemplary mattress defect detection system entails the steps of: (a) positioning the guide rail a substantially uniform distance over the top surface of the mattress, such that the guide rail is oriented laterally or longitudinally relative to the mattress, in a substantially horizontal orientation and parallel with a top surface of the mattress; (b) further positioning the guide rail proximal to a first terminal edge of the mattress; (c) slidably positioning the control housing on the guide rail substantially at the first terminal end of the guide rail; (d)

obtaining, via the at least one measurement laser, a depression depth of the body depression of the current measurement site; (e) transmitting the depression depth of the body depression of the current measurement site to the at least one computing device; (f) determining, via the user application, whether the depression depth of the body depression of the current measurement site exceeds a pre-defined threshold; (g) upon the user application determining that the depression depth of the body depression of the current measurement site exceeds a pre-defined threshold, the user application determining that the mattress is defective; (h) slidably moving the control housing along the guide rail toward the opposing second terminal end of the guide rail until a further measurement site is reached; (i) repeating steps (d)-(h) until the control housing reaches the opposing second terminal end of the guide rail; (j) incrementally moving the guide rail toward an opposing second terminal edge of the mattress; and (k) repeating steps (c)-(j) until the guide rail reaches the opposing second terminal edge of the mattress.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Figure 1:
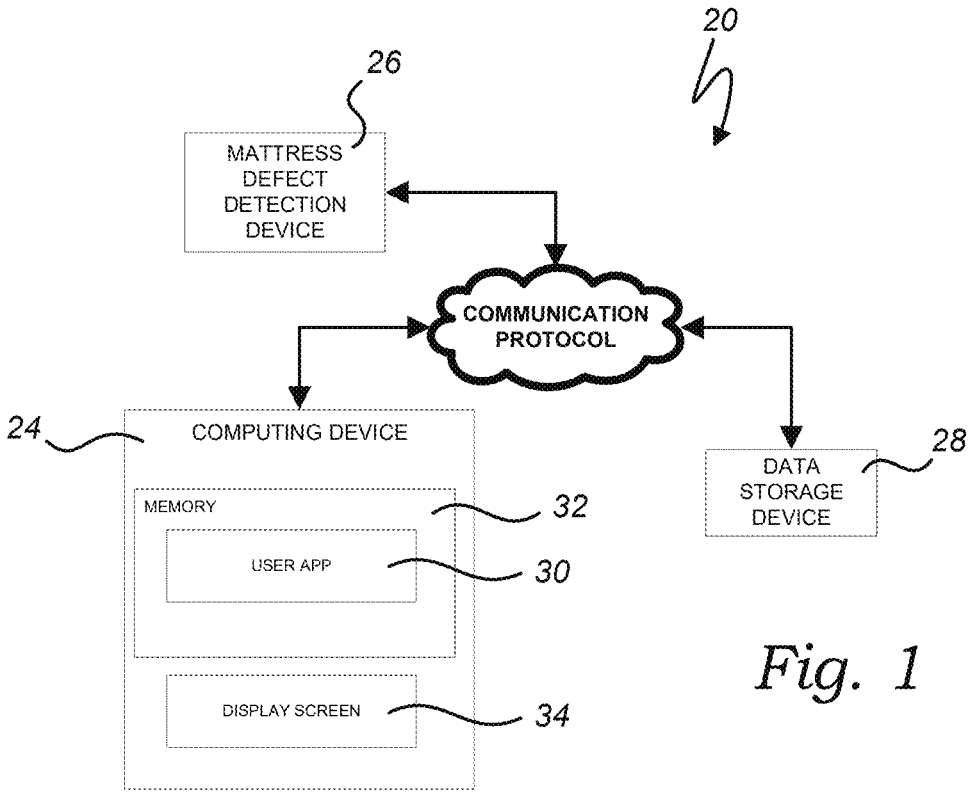
FIG. 1 is a simplified schematic view of an exemplary mattress defect detection system, in accordance with at least one embodiment.

Turning now to FIG. 1, there is shown a simplified schematic view of an exemplary mattress defect detection system 20 configured for analyzing a mattress 22 for potential defects, as discussed further below. Accordingly, in at least one embodiment, the system 20 provides an at least one computing device 24 configured for receiving and processing select data obtained by an at least one mattress defect detection device 26, as also discussed further below. In at least one embodiment, the computing device 24 is in the possession or under the control of a user who is desirous of utilizing the system 20 to analyze a mattress 22 for potential defects-such as a service technician or a mattress 22 owner, for example. In at least one embodiment, the computing device 24 and the at least one mattress defect detection device 26 are one and the same—as such, it is intended that those terms as used herein are to be interchangeable with one another. In at least one embodiment, the system 20 further provides an at least one data storage device 28 in selective communication with the computing device 24 and configured for storing said data obtained by the at least one mattress defect detection device 26 and processed by the computing device 24, along with certain other data as discussed further below. In at least one embodiment, the computing device 24 and data storage device 28 are also one and the same—as such, it is intended that those terms as used herein are to be interchangeable with one another as well.

At the outset, it should be noted that communication between each of the computing device 24, mattress defect detection device 26, and data storage device 28 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. Similarly, in at least one embodiment, communications between each of the computing device 24, mattress defect detection device 26, and data storage device 28 may be encrypted using any encryption method (or combination of methods) now known or later developed. It should also be noted that the term "computing device 24" is intended to include any type of computing or electronic device, now known or later developed, capable of substantially carrying out the functionality described herein-such as desktop computers, mobile phones, smartphones, laptop computers, tablet computers, personal data assistants, gaming devices, wearable devices, etc. As such, the system 20 should not be read as being limited to use with any one particular type of computing or electronic device, even though certain exemplary devices may be mentioned or shown herein for illustrative purposes.

In at least one embodiment, the computing device 24 contains the hardware and software necessary to carry out the exemplary methods for analyzing a mattress 22 for potential defects, as described herein. Furthermore, in at least one embodiment, the computing device 24 comprises a plurality of computing and/or electronic devices selectively working in concert with one another to carry out the exemplary methods for analyzing a mattress 22 for potential defects, as described herein. In at least one embodiment, the computing device 24 provides a user application 30 residing locally in memory 32 on the computing device 24 (for example, as a standalone application on the computing device 24), the user application 30 being configured for selectively communicating with the computing device 24, as discussed further below. In at least one alternate embodiment, the functionality provided by the user application 30 resides remotely in memory on a server in communication with the computing device 24, with the computing device 24 capable of accessing said functionality via an online portal hosted by (or at least in communication with) the system 20, either in addition to or in lieu of the user application 30 residing locally in memory 32 on the computing device 24. For simplicity purposes, the functionality provided by the user application 30 will be described herein as such-even though certain embodiments may provide some or all of said functionality through an online portal. It should also be noted that, for simplicity purposes, when discussing functionality and the various methods that may be carried out by the system 20 herein, the terms "computing device," "user application" and "server" are intended to be interchangeable. In that regard, in at least one further embodiment, the computing device 24 and server are one and the same. With continued reference to FIG. 1, in at least one embodiment, the computing device 24 provides an at least one display screen 34 for providing an at least one graphical user interface to assist the associated user with accessing and utilizing the various functions provided by the system 20. It should also be noted that the term "memory" is intended to include any type of electronic storage medium (or combination of storage mediums) now known or later developed, such as local hard drives, RAM, flash memory, secure digital ("SD") cards, external storage devices, network or cloud storage devices, integrated circuits, etc.

Figure 2:
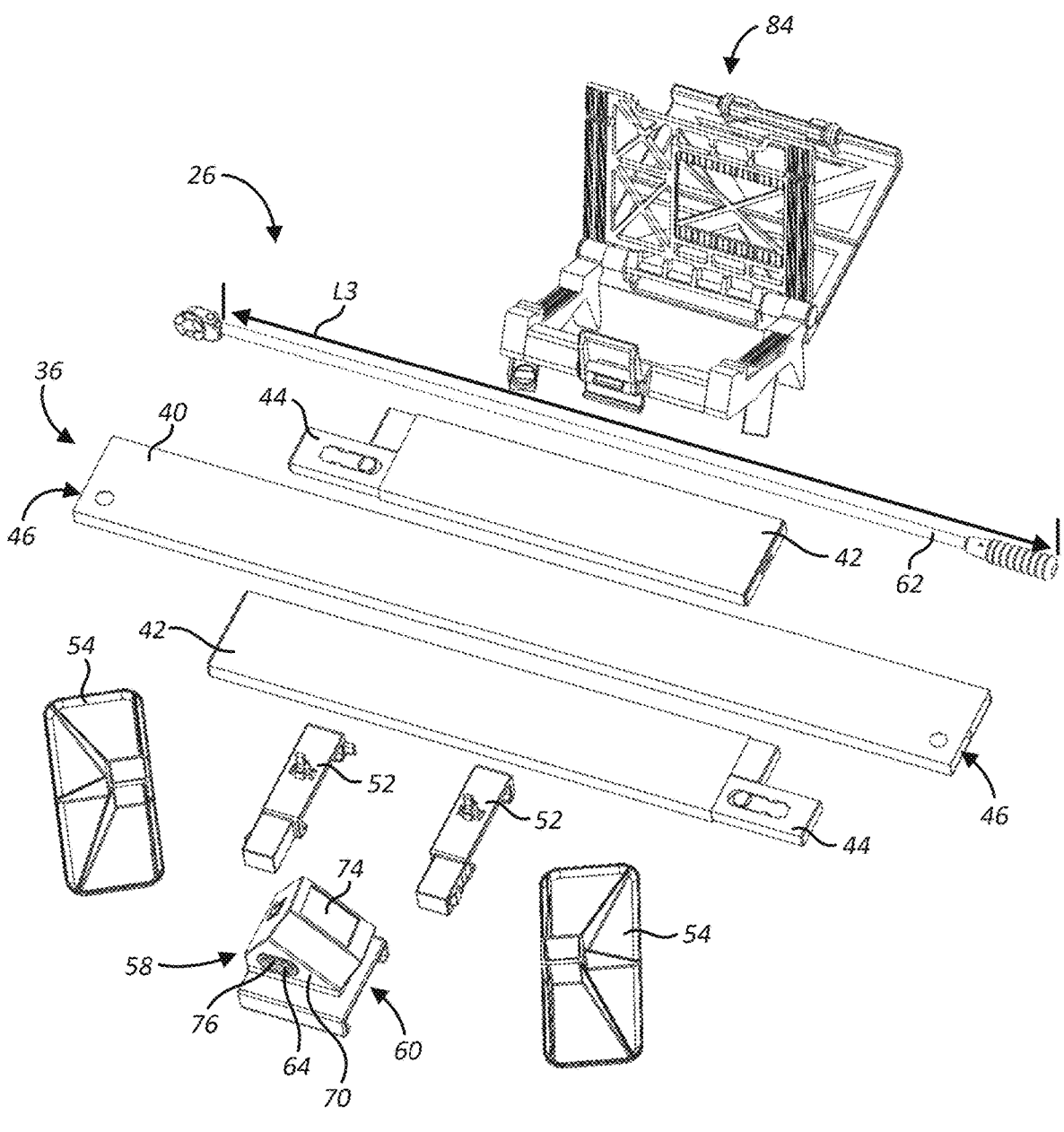
FIG. 2 is a perspective view of an exemplary mattress defect detection device of the system, in accordance with at least one embodiment, with the components of the device in a disassembled state.
Figure 3:
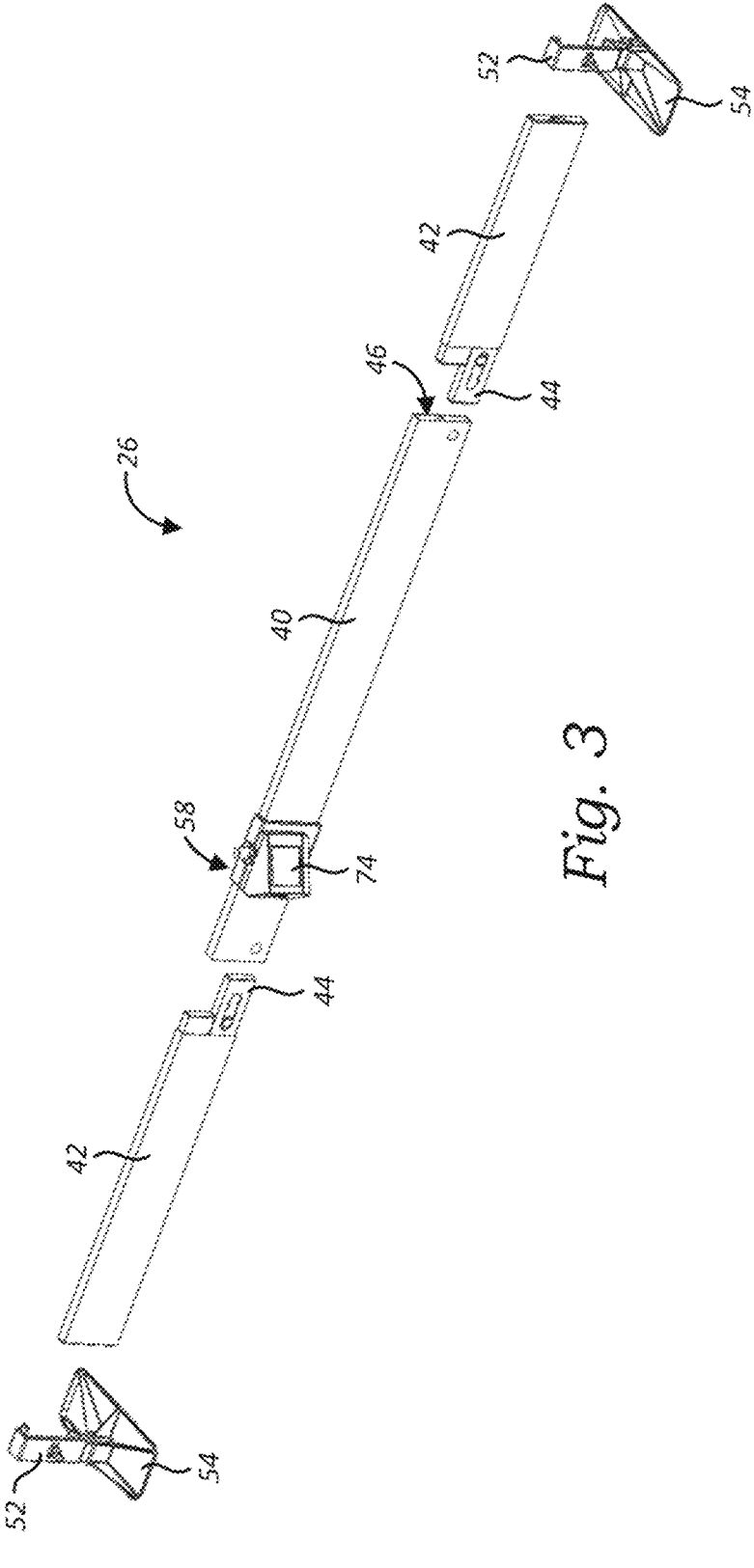
FIG. 3 is a further perspective view thereof, with the components of the device in a partially assembled state, in accordance with at least one embodiment.
Figure 4:
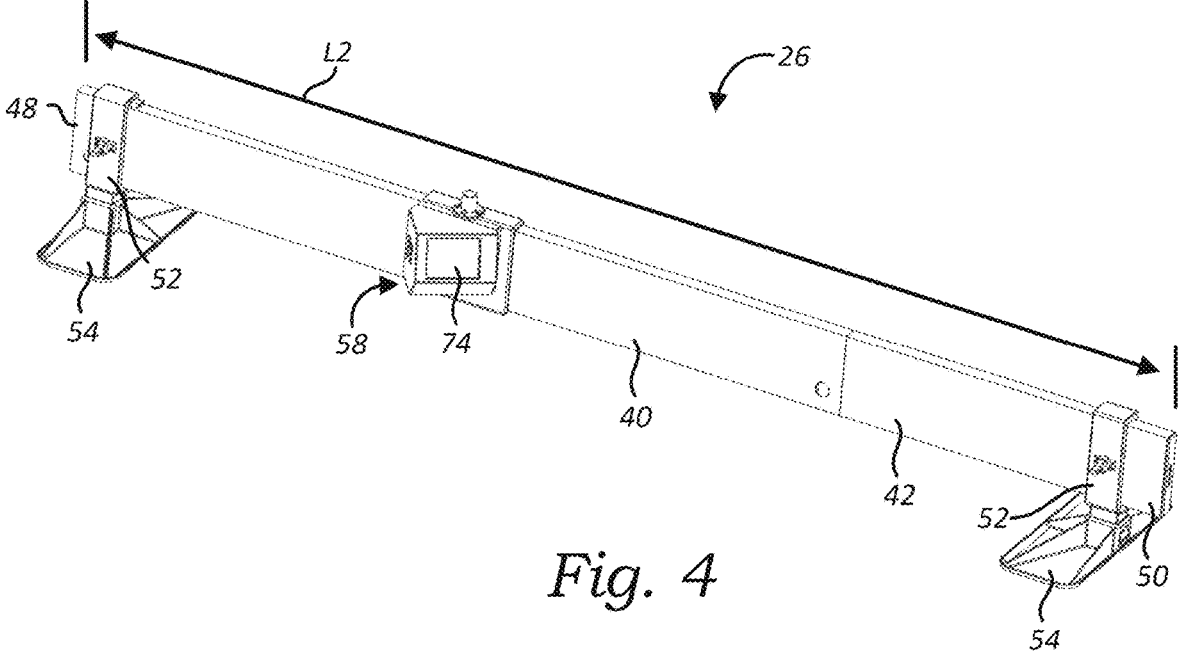
FIG. 4 is a further perspective view thereof, with the components of the device in an assembled state, in accordance with at least one embodiment.

In at least one embodiment, as illustrated in FIG. 2, the at least one mattress defect detection device 26 provides an elongate guide rail 36 sized and configured for being oriented laterally or longitudinally relative to the mattress 22, in a substantially horizontal orientation and parallel with a top surface 38 of the mattress 22, such that the guide rail 36 spans an entire width W1 or length L1, respectively, of the mattress 22. In at least one alternate embodiment, the guide rail 36 spans less than the entire width W1 or length L1 of the mattress 22. In at least one embodiment, the guide rail 36 is selectively lengthwise adjustable, thereby allowing a rail length L2 of the guide rail 36 to be selectively sized in order accommodate mattresses 22 of varying widths and lengths. In at least one such embodiment, the guide rail 36 is comprised of a plurality of telescoping rail segments. In at least one alternate such embodiment, as best illustrated in FIGS. 2-4, the guide rail 36 is selectively modular and comprises an elongate primary rail 40 and an at least one elongate rail extension 42 configured for removable engagement with a terminal end of the primary rail 40 so as to increase the rail length L2 as needed. In at least one embodiment, the at least one rail extension 42 is removably engageable with a terminal end of the primary rail 40 using a tab 44 and slot 46 engagement. In still further embodiments, any other mechanism or technique (now known or later developed) capable of creating a removable engagement between the at least one rail extension 42 and a terminal end 48 or 50 of the primary rail 40 may be substituted-including but not limited to magnets, snaps, hook-and-loop material, adhesives, etc. It should be noted that, in further embodiments, the guide rail 36 (including the primary rail 40 and at least one rail extension 42, where applicable) may take on any other sizes, shapes, dimensions, quantities and/or configurations now known or later developed, so long as the mattress defect detection device 26 is capable of substantially carrying out the functionality described herein.

In at least one embodiment, the at least one mattress defect detection device 26 further provides a pair of support legs 52 configured for engagement with the guide rail 36 in order to elevate the guide rail 36 a substantially uniform distance above the top surface 38 of the mattress 22 (FIGS. 7 and 8), thereby vertically spacing apart the guide rail 36 and the top surface 38 of the mattress 22. In at least one embodiment, the support legs 52 are engaged (permanently or removably) with the opposing terminal ends 48 and 50 of the guide rail 36. In at least one embodiment, each of the support legs 52 provides a support foot 54 configured for being placed on a substantially horizontal surface-such as the top surface 38 of the mattress 22 or the floor 56 on which the mattress 22 is positioned, for example—such that the corresponding support leg 52 extends substantially perpendicularly from the support foot 54 in a substantially vertical orientation. It should be noted that, in further embodiments, the support legs 52 and support feet 54 may take on any other sizes, shapes, dimensions, quantities and/or configurations now known or later developed, so long as the mattress defect detection device 26 is capable of substantially carrying out the functionality described herein. In at least one embodiment, each support foot 54 provides an at least one support wheel (not shown) positioned and configured for allowing the guide rail 36 to be moved and repositioned relative to the mattress 22. For example, where the guide rail 36 is oriented laterally relative to the mattress 22 (FIG. 7), the support wheels could allow for the guide rail 36 to be moved longitudinally relative to the mattress 22; and where the guide rail 36 is oriented longitudinally relative to the mattress 22 (FIG. 8), the support wheels could allow for the guide rail 36 to be moved laterally relative to the mattress 22. In at least one such embodiment, the support wheels are in mechanical communication with an at least one motor configured for causing the support wheels (and, in turn, the guide rail 36) to automatically move relative to the mattress 22. In still further embodiments, any other mechanism or technique (now known or later developed) capable of manually or automatically moving the guide rail 36 relative to the mattress 22 may be substituted, so long as the mattress defect detection device 26 is capable of substantially carrying out the functionality described herein.

Figure 5:
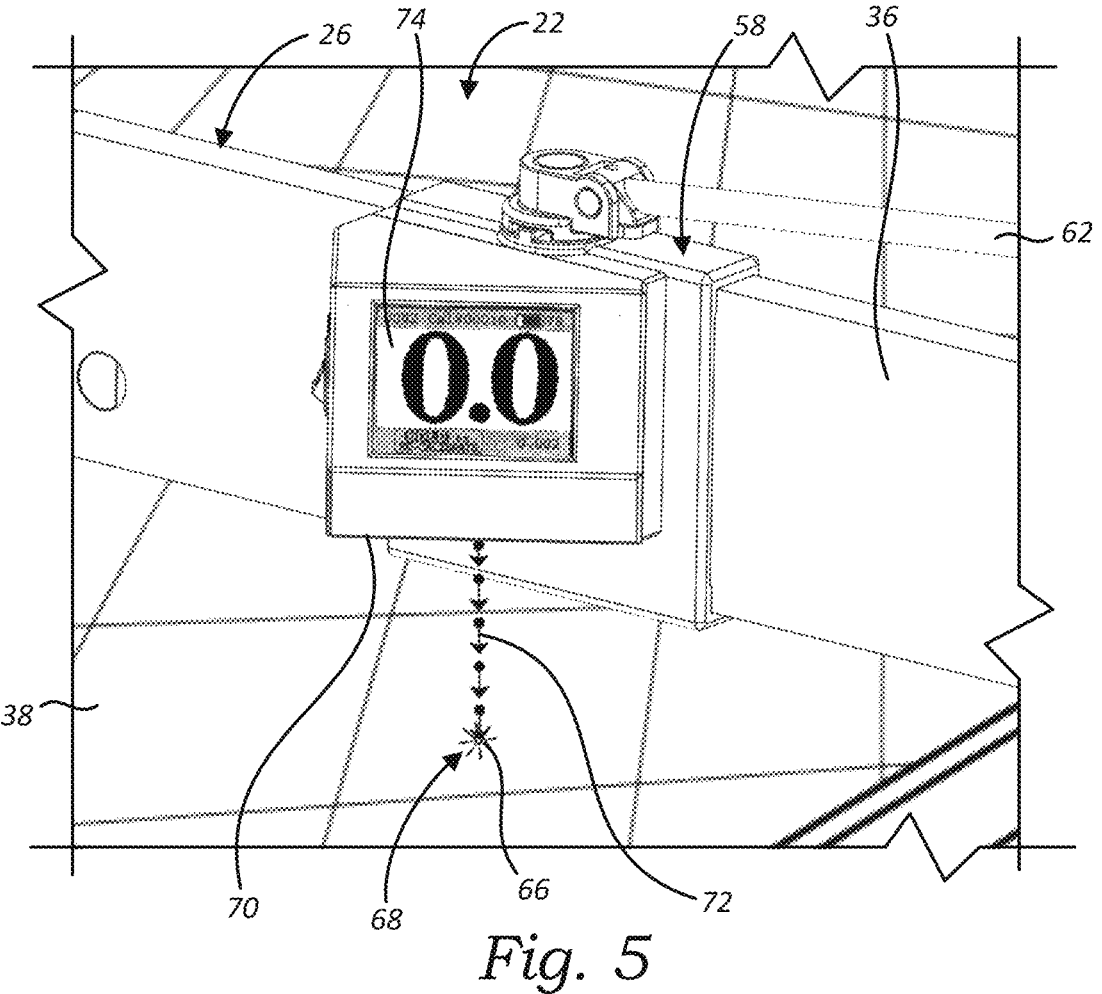
FIG. 5 is a perspective view of a display screen of the device, in accordance with at least one embodiment.
Figures 6, 6A:
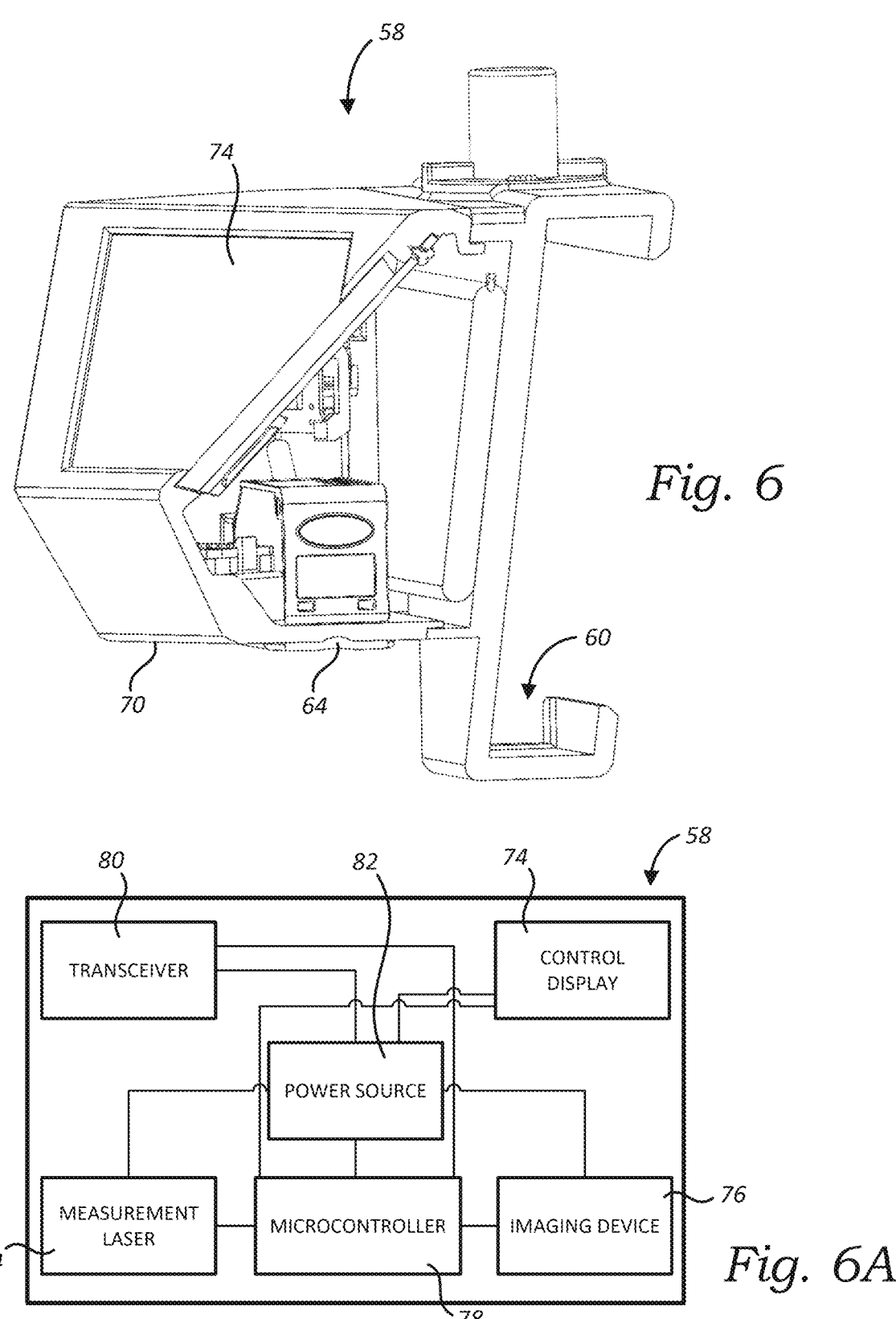
FIG. 6 is a perspective view of a control housing of the device, in accordance with at least one embodiment, with a portion of the control housing cut away for illustrative purposes.
FIG. 6A is a simplified schematic view of the control housing, in accordance with at least one embodiment.
Figure 7:
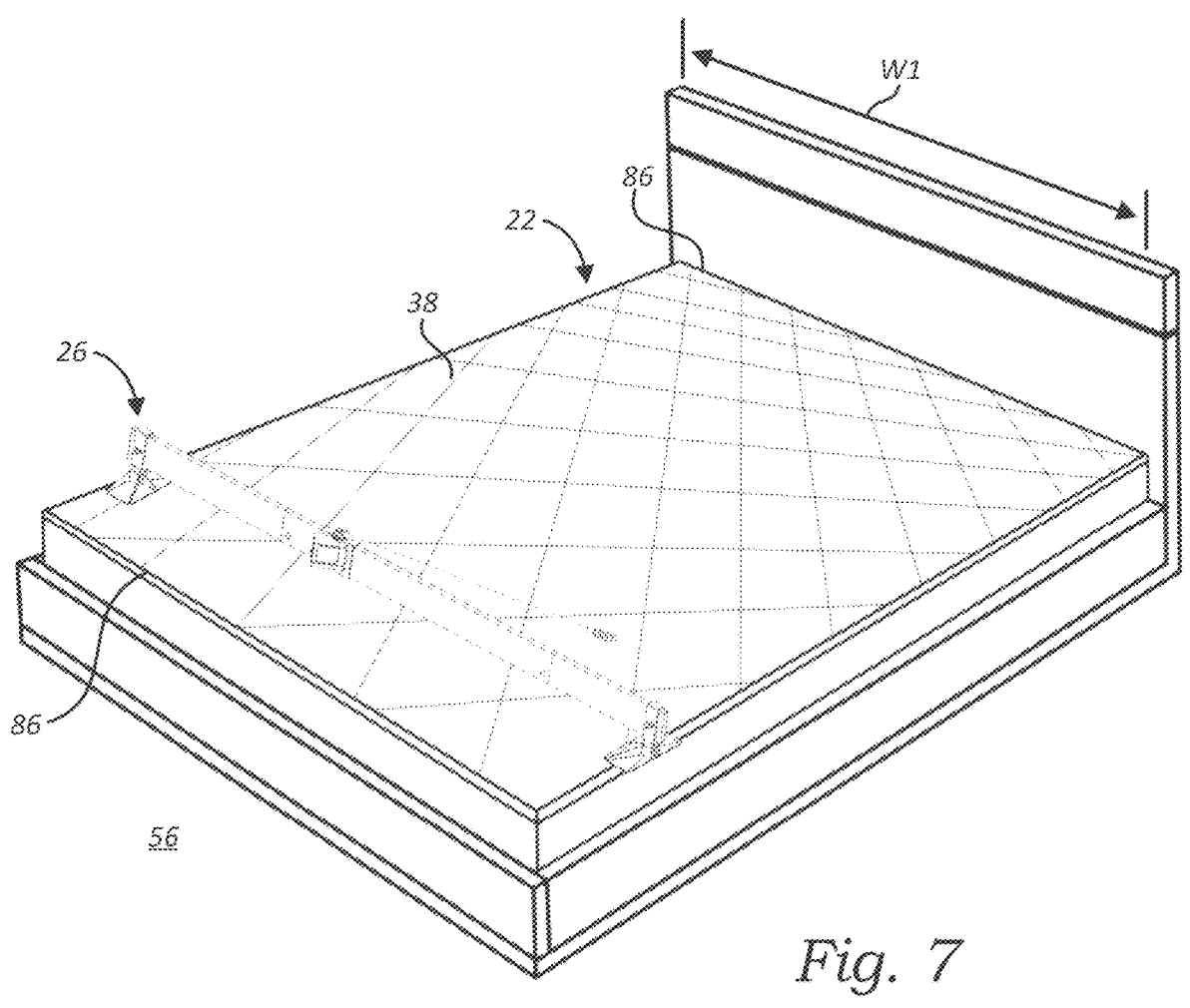
FIG. 7 is a perspective view of the device positioned laterally across an exemplary bed, in accordance with at least one embodiment.
Figure 8:
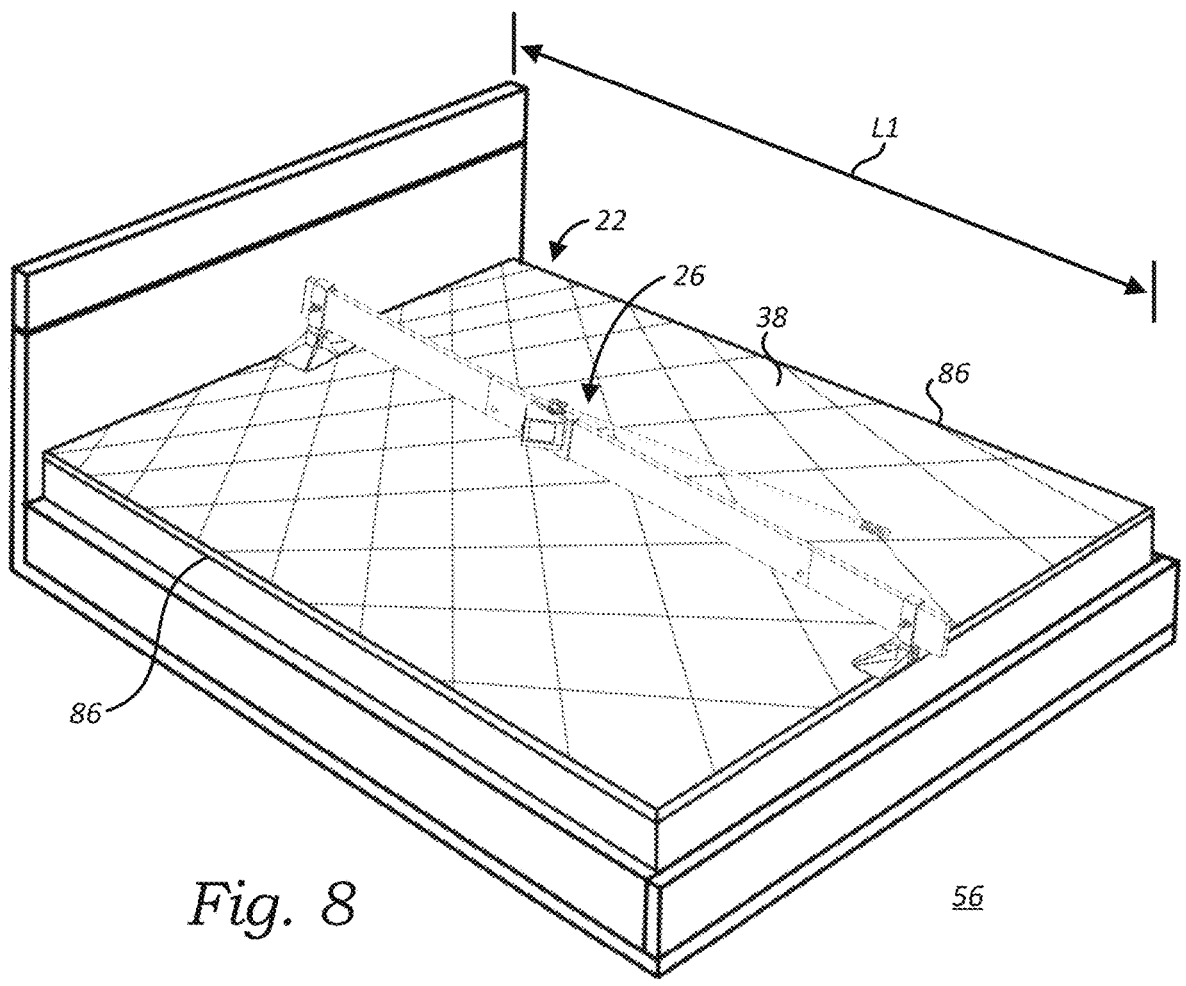
FIG. 8 is a perspective view of the device positioned longitudinally across an exemplary bed, in accordance with at least one embodiment.

In at least one embodiment, as best illustrated in FIGS. 5 and 6, the at least one mattress defect detection device 26 further provides a control housing 58 slidably engaged with the guide rail 36 and capable of selectively traversing the rail length L2 of the guide rail 36 between a first terminal end 48 and an opposing second terminal end 50 of the guide rail 36, the purpose for which is discussed further below. In at least one embodiment, the control housing 58 provides a guide slot 60 through which the guide rail 36 extends, thereby allowing the control housing 58 to slidably traverse the guide rail 36. In at least one embodiment, the guide slot 60 glides along the guide rail 36 by means of friction interference. In at least one alternate embodiment, the guide slot 60 provides an at least one wheel, roller or ball bearing positioned and configured for creating a rolling contact between the guide slot 60 and the guide rail 36. In further alternate embodiments, any other mechanism or technique (now known or later developed) capable of allowing the control housing 58 to selectively traverse the rail length L2 of the guide rail 36 may be substituted, so long as the mattress defect detection device 26 is capable of substantially carrying out the functionality described herein. In at least one embodiment, the control housing 58 further provides a guide wand 62 pivotally engaged with the control housing 58 and configured for assisting with manually moving the control housing 58 relative to the guide rail 36 (FIGS. 7 and 8). In at least one such embodiment, the guide wand 62 is telescoping, thereby allowing a wand length L3 of the guide wand 62 to be selectively adjusted as needed, depending on the length L1 or width W1 of the mattress 22. In at least one embodiment, the guide wand 62 is removably engageable with the control housing 58. In at least one alternate embodiment, the guide wand 62 is permanently engaged with the control housing 58. It should be noted that, in further embodiments, the guide wand 62 may take on any other sizes, shapes, dimensions, quantities and/or configurations now known or later developed, so long as the mattress defect detection device 26 is capable of substantially carrying out the functionality described herein. In at least one further alternate embodiment, the control housing 58 is configured for automatically traversing the rail length L2 of the guide rail 36. In at least one such embodiment, the control housing 58 provides a motor in mechanical communication with an at least one wheel or roller provided by the guide slot 60 and in rolling contact with the guide rail 36, such that the motor causes the control housing 58 to automatically traverse the guide rail 36. In still further embodiments, any other mechanism or technique (now known or later developed) capable of manually or automatically moving the control housing 58 relative to the guide rail 36 may be substituted, so long as the mattress defect detection device 26 is capable of substantially carrying out the functionality described herein.

With continued reference to FIGS. 5 and 6, in at least one embodiment, the control housing 58 further provides an at least one measurement laser 64 positioned and configured for measuring a distance between the measurement laser 64 and the top surface 38 of the mattress 22 (hereinafter referred to as a "body depression" 66 for simplicity purposes) at a current position of the at least one measurement laser 64 relative to the mattress 22 (hereinafter referred to as a "measurement site" 68 for simplicity purposes). In at least one embodiment, the at least one measurement laser 64 is positioned in a bottom surface 70 of the control housing 58 and is oriented so as to emit a laser beam 72 away from the bottom surface 70 of the control housing 58 in a direction that is substantially perpendicular to the top surface 38 of the mattress 22. However, in further embodiments, the at least one measurement laser 64 may be positioned elsewhere on the control housing 58, so long as the laser beam 72 of the at least one measurement laser 64 is emitted in a direction that is substantially perpendicular to the top surface 38 of the mattress 22. In at least one embodiment, the at least one measurement laser 64 is a Class 2 CMOS laser; however, in further embodiments, any other type of laser (now known or later developed) capable of measuring the distance between the measurement laser 64 and the top surface 38 of the mattress 22 may be substituted, so long as the mattress defect detection device 26 is capable of substantially carrying out the functionality described herein.

In at least one embodiment, the control housing 58 further provides a control display 74 configured for displaying select data related to the mattress 22, such as a current body depression 66, for example. Additionally, in at least one embodiment, the control housing 58 further provides an at least one imaging device 76 positioned and configured for capturing photos and/or videos of the measurement site 68 in tandem with the at least one measurement laser 64 measuring the body depression 66 at the same measurement site 68. In at least one embodiment, the at least one imaging device 76 is positioned in the bottom surface 70 of the control housing 58; however, in further embodiments, the at least one imaging device 76 may be positioned elsewhere on the control housing 58. In at least one still further embodiment, the at least one imaging device 76 is positioned on the computing device 24, with the computing device 24 positioned proximal to the mattress 22 and the mattress defect detection device 26. In at least one embodiment, as illustrated in FIG. 6A, the control housing 58 further provides an at least one microcontroller 78 in electrical communication with one or both of the at least one measurement laser 64 and imaging device 76 for controlling and receiving select data from one or both of the at least one measurement laser 64 and imaging device 76. In at least one embodiment, where the mattress defect detection device 26 incorporates a motor as discussed above, the microcontroller 78 may further be in electrical communication with said motor for controlling said motor as well. In at least one embodiment, the control housing 58 further provides a transceiver 80 in electrical communication with the microcontroller 78, and in remote communication with the computing device 24, thereby allowing the microcontroller 78 to transmit select data (including, for example, body depressions 66, photos, videos and select location details associated with each measurement site 68) to the computing device 24, as discussed further below. In at least one embodiment, the control housing 58 further provides an at least one power source 82 in electrical communication with each of the at least one measurement laser 64, imaging device 76, microcontroller 78 and transceiver 80, and configured for selectively powering said components. In at least one embodiment, the at least one power source 82 is an at least one battery (either rechargeable or non-rechargeable). In at least one alternate embodiment, the at least one power source 82 is an AC power supply or a DC power supply. In further alternate embodiments, the at least one power source 82 may be any other type of power source (now known or later developed) capable of providing the requisite power to each of the above-discussed components, so long as the mattress defect detection device 26 is capable of substantially carrying out the functionality described herein. In at least one still further alternate embodiment, the at least one power source 82 is located external to the control housing 58. It should be noted that, in further embodiments, the control housing 58 and the various components contained therein may take on any other sizes, shapes, dimensions, quantities and/or configurations now known or later developed, so long as the mattress defect detection device 26 is capable of substantially carrying out the functionality described herein.

In at least one embodiment, as illustrated in FIG. 1, the at least one mattress defect detection device 26 further provides an at least one carrying case 84 configured for storing the various components of the mattress defect detection device 26 in a disassembled state. It should be noted that, in further embodiments, the carrying case 84 may take on any other sizes, shapes, dimensions, quantities and/or configurations now known or later developed, so long as the mattress defect detection device 26 is capable of substantially carrying out the functionality described herein.

Figure 9:
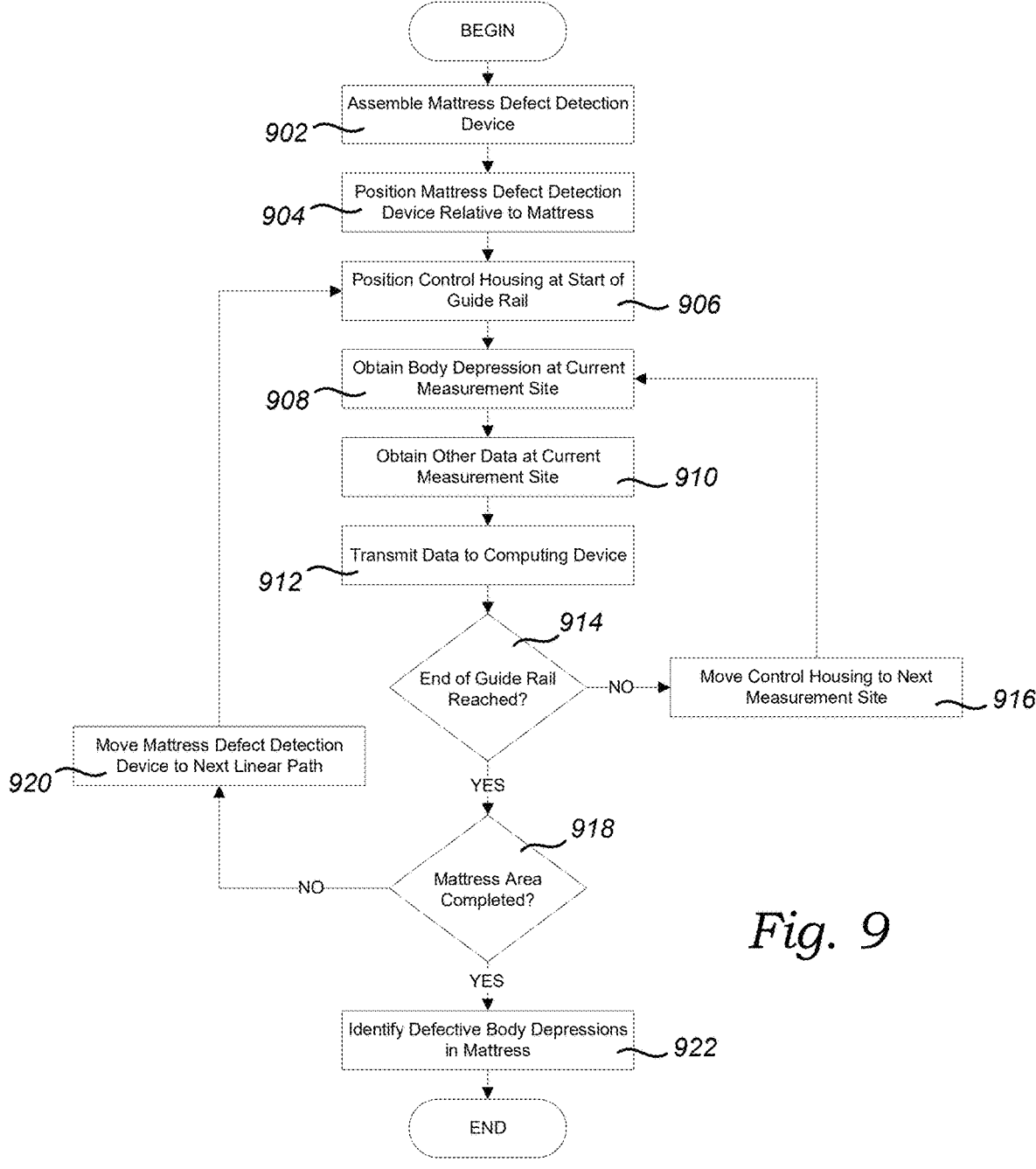
FIG. 9 is a flow diagram of an exemplary method for determining whether a given mattress is defective, in accordance with at least one embodiment.

In at least one embodiment, and as illustrated in the flow diagram of FIG. 9, an exemplary method of using the system 20 to analyze a given mattress 22 for potential defects involves the following steps. First, the mattress defect detection device 26 is assembled (902) is set up. In at least one embodiment, assembling the mattress defect detection device 26 involves assembling the guide rail 36 to the required rail length L2 (depending on the width W1 and/or length L1 of the mattress 22), slidably engaging the control housing 58 with the guide rail 36, engaging the support feet 54 with the support legs 52, engaging the support legs 52 with the guide rail 36, and engaging the guide wand 62 with the control housing 58. The mattress defect detection device 26 is then positioned relative to the mattress 22 (904)—typically starting at a terminal edge 86 (i.e., either a lateral edge or a longitudinal edge) of the mattress 22—and the control housing 58 is positioned at the first terminal end 48 of the guide rail 36 (906). In at least one embodiment, the at least one measurement laser 64 is first calibrated before the analysis of the mattress 22 begins. Once calibrated, the body depression 66 of the current measurement site 68 is obtained by the at least one measurement laser 64 (908), and a photo and/or video of the measurement site 68 is captured by the at least one imaging device 76 (910). The measurement site 68 data is then transmitted to the computing device 24 (912), where the measurement site 68 data is processed and stored. The control housing 58 is then moved to the next measurement site 68 (916), where steps (908)-(912) are repeated, and this process is repeated until the control housing 58 reaches the opposing second terminal end 50 of the guide rail 36 (914). The mattress defect detection device 26 is then repositioned relative to the mattress 22 (preferably toward an opposing terminal edge 86 of the mattress 22) so as to cover a different linear path of the mattress 22 (920), at which point steps (906)-(916) are repeated, and this process is repeated until the mattress defect detection device 26 reaches the opposing terminal edge 86 of the mattress 22 (918). Upon the user application 30 determining that one or more of the body depressions 66 have a depression depth that exceeds a pre-defined threshold, the user application 30 determines that the mattress 22 is defective, and communicates this information to the user (922). According to manufacturer standards, a mattress 22 having one or more body depressions 66 having a depression depth of 1.5 inches or greater is considered defective. Accordingly, in at least one embodiment, the pre-defined threshold is 1.5 inches; however, in further embodiments, the pre-defined threshold may be less than 1.5 inches or greater than 1.5 inches. In at least one embodiment, the user application 30 generates a detailed report that includes the measurement site 68 data (i.e., measurement site 68 location, body depression 66, measurement site 68 photo, measurement site 68 video, etc. for each measurement site 68) for the mattress 22, and communicates the report to the user.

In at least one alternate embodiment, rather than the control housing 58 capturing and transmitting to the computing device 24 measurement site 68 data for every measurement site 68, the control housing 58 instead traverses the guide rail 36 and only transmits measurement site 68 data for any measurement site 68s with a body depression 66 having a depression depth that exceeds the pre-defined threshold. Additionally, in at least one embodiment, these same methods may be performed on a box spring of the mattress 22 as well, in order to analyze the box spring for potential defects in a similar manner. In at least one embodiment, the user application 30 assigns a unique numeric or alphanumeric site identifier for each measurement site 68, and associates the site identifier with the measurement site 68 data for the corresponding measurement site 68, which helps prevent the use of that same measurement site 68 data for a different measurement site 68, thereby preventing fraud.

Thus, system 20 and associated methods discussed above are a significant improvement over the known prior solutions for detecting defects in a mattress 22, as the system 20 accurately detects defects in a mattress 22 in a consistent and uniform manner that eliminates any possibility of subjectivity, human error or fraud in the process.

Aspects of the present specification may also be described as the following embodiments:

1. A mattress defect detection system for analyzing a mattress for potential defects, the system comprising: an at least one mattress defect detection device comprising: an elongate guide rail sized and configured for being oriented laterally or longitudinally relative to the mattress, in a substantially horizontal orientation and parallel with a top surface of the mattress; a pair of support legs configured for engagement with the guide rail in order to elevate the guide rail a substantially uniform distance above the top surface of the mattress, thereby vertically spacing apart the guide rail and the top surface of the mattress; each of the support legs providing a support foot configured for being placed on a substantially horizontal surface; and a control housing slidably engaged with the guide rail and capable of selectively traversing a rail length of the guide rail between a first terminal end and an opposing second terminal end of the guide rail, the control housing providing: an at least one measurement laser positioned and configured for measuring a depression depth of a body depression in the top surface of the mattress at an at least one measurement site, the at least one measurement laser oriented so as to emit a laser beam toward the top surface of the mattress in a direction that is substantially perpendicular to the top surface of the mattress; and an at least one microcontroller in electrical communication with the at least one measurement laser for controlling and receiving select data from the at least one measurement laser; and a user application residing in memory on an at least one computing device, the at least one computing device in selective communication with the at least one mattress defect detection device and configured for receiving and processing select data related to the mattress, obtained by at least one mattress defect detection device; whereby, during use of the system, with the guide rail positioned over the top surface of the mattress, the control housing is moved along the guide rail between the first and second terminal ends, while the at least one measurement laser measures the depression depth of the body depression in the top surface of the mattress at each of the at least one measurement site, with the at least one depression depth measurement being subsequently transmitted to the at least one computing device, where the user application determines whether one or more of the at least one body depression has a depression depth that exceeds a pre-defined threshold, in which case the user application determines that the mattress is defective.

2. The mattress defect detection system according to embodiment 1, wherein the guide rail spans an entire width or length of the mattress.

3. The mattress defect detection system according to embodiments 1-2, wherein the guide rail spans less than an entire width or length of the mattress.

4. The mattress defect detection system according to embodiments 1-3, wherein the guide rail is selectively lengthwise adjustable, thereby allowing the rail length of the guide rail to be selectively sized in order accommodate a width or a length of the mattress.

5. The mattress defect detection system according to embodiments 1-4, wherein the guide rail is comprised of a plurality of telescoping rail segments.

6. The mattress defect detection system according to embodiments 1-5, wherein the guide rail is selectively modular and comprises an elongate primary rail and an at least one elongate rail extension configured for removable engagement with a terminal end of the primary rail so as to selectively increase the rail length.

7. The mattress defect detection system according to embodiments 1-6, wherein the support legs are engaged with the first and second terminal ends of the guide rail.

8. The mattress defect detection system according to embodiments 1-7, wherein each support foot provides an at least one support wheel positioned and configured for allowing the guide rail to be moved and repositioned relative to the mattress.

9. The mattress defect detection system according to embodiments 1-8, wherein the support wheels are in mechanical communication with an at least one motor configured for causing the support wheels and, in turn, the guide rail to automatically move relative to the mattress.

10. The mattress defect detection system according to embodiments 1-9, wherein the control housing provides a guide slot through which the guide rail extends, thereby allowing the control housing to slidably traverse the guide rail.

11. The mattress defect detection system according to embodiments 1-10, wherein the guide slot glides along the guide rail by means of a friction interference.

12. The mattress defect detection system according to embodiments 1-11, wherein the guide slot provides an at least one wheel, roller or ball bearing positioned and configured for creating a rolling contact between the guide slot and the guide rail.

13. The mattress defect detection system according to embodiments 1-12, 30 wherein the control housing is configured for automatically traversing the rail length of the guide rail.

14. The mattress defect detection system according to embodiments 1-13, wherein the control housing provides a motor in mechanical communication with the at least one wheel or roller provided by the guide slot, such that the motor causes the control housing to automatically traverse the guide rail.

15. The mattress defect detection system according to embodiments 1-14, wherein the control housing further provides a guide wand pivotally engaged with the control housing and configured for assisting with manually moving the control housing relative to the guide rail.

16. The mattress defect detection system according to embodiments 1-15, wherein the guide wand is telescoping, thereby allowing a wand length of the guide wand to be selectively adjusted.

17. The mattress defect detection system according to embodiments 1-16, wherein the guide wand is removably engageable with the control housing.

18. The mattress defect detection system according to embodiments 1-17, wherein the guide wand is permanently engaged with the control housing.

19. The mattress defect detection system according to embodiments 1-18, wherein the at least one measurement laser is positioned in a bottom surface of the control housing.

20. The mattress defect detection system according to embodiments 1-19, wherein the at least one measurement laser is a Class 2 CMOS laser.

21. The mattress defect detection system according to embodiments 1-20, wherein the control housing further provides a control display configured for displaying select data related to the mattress.

22. The mattress defect detection system according to embodiments 1-21, wherein the control housing further provides an at least one imaging device in electrical communication with the at least one microcontroller, the at least one imaging device positioned and configured for capturing at least one of a site photo and a site video of the at least one measurement site in tandem with the at least one measurement laser measuring the body depression of said at least one measurement site.

23. The mattress defect detection system according to embodiments 1-22, wherein the at least one imaging device is positioned in a bottom surface of the control housing.

24. The mattress defect detection system according to embodiments 1-23, wherein the control housing further provides a transceiver in electrical communication with the microcontroller and in remote communication with the computing device, thereby allowing the microcontroller to transmit to the computing device select data related to the mattress.

25. The mattress defect detection system according to embodiments 1-24, wherein the control housing further provides an at least one power source in electrical communication with at least one of the at least one measurement laser, imaging device, microcontroller and transceiver, and configured for selectively powering said components.

26. The mattress defect detection system according to embodiments 1-25, wherein the at least one power source is an at least one battery.

27. The mattress defect detection system according to embodiments 1-26, wherein the at least one power source is an AC power supply or a DC power supply.

28. The mattress defect detection system according to embodiments 1-27, further comprising an at least one carrying case configured for storing the various components of the mattress defect detection device in a disassembled state.

29. The mattress defect detection system according to embodiments 1-28, further comprising an at least one data storage device in selective communication with the computing device and configured for storing said data obtained by the at least one mattress defect detection device and processed by the computing device.

30. A mattress defect detection device for analyzing a mattress for potential defects, the device comprising: an elongate guide rail sized and configured for being oriented laterally or longitudinally relative to the mattress, in a substantially horizontal orientation and parallel with a top surface of the mattress; a pair of support legs configured for engagement with the guide rail in order to elevate the guide rail a substantially uniform distance above the top surface of the mattress, thereby vertically spacing apart the guide rail and the top surface of the mattress; each of the support legs providing a support foot configured for being placed on a substantially horizontal surface; and a control housing slidably engaged with the guide rail and capable of selectively traversing a rail length of the guide rail between a first terminal end and an opposing second terminal end of the guide rail, the control housing providing: an at least one measurement laser positioned and configured for measuring a depression depth of a body depression in the top surface of the mattress at an at least one measurement site, the at least one measurement laser oriented so as to emit a laser beam toward the top surface of the mattress in a direction that is substantially perpendicular to the top surface of the mattress; and an at least one microcontroller in electrical communication with the at least one measurement laser for controlling and receiving select data from the at least one measurement laser.

31. The mattress defect detection device according to embodiment 30, wherein the guide rail spans an entire width or length of the mattress.

32. The mattress defect detection device according to embodiments 30-31, wherein the guide rail spans less than an entire width or length of the mattress.

33. The mattress defect detection device according to embodiments 30-32, wherein the guide rail is selectively lengthwise adjustable, thereby allowing the rail length of the guide rail to be selectively sized in order accommodate a width or a length of the mattress.

34. The mattress defect detection device according to embodiments 30-33, wherein the guide rail is comprised of a plurality of telescoping rail segments.

35. The mattress defect detection device according to embodiments 30-34, wherein the guide rail is selectively modular and comprises an elongate primary rail and an at least one elongate rail extension configured for removable engagement with a terminal end of the primary rail so as to selectively increase the rail length.

36. The mattress defect detection device according to embodiments 30-35, wherein the support legs are engaged with the first and second terminal ends of the guide rail.

37. The mattress defect detection device according to embodiments 30-36, wherein each support foot provides an at least one support wheel positioned and configured for allowing the guide rail to be moved and repositioned relative to the mattress.

38. The mattress defect detection device according to embodiments 30-37, wherein the support wheels are in mechanical communication with an at least one motor configured for causing the support wheels and, in turn, the guide rail to automatically move relative to the mattress.

39. The mattress defect detection device according to embodiments 30-38, wherein the control housing provides a guide slot through which the guide rail extends, thereby allowing the control housing to slidably traverse the guide rail.

40. The mattress defect detection device according to embodiments 30-39, wherein the guide slot glides along the guide rail by means of a friction interference.

41. The mattress defect detection device according to embodiments 30-40, wherein the guide slot provides an at least one wheel, roller or ball bearing positioned and configured for creating a rolling contact between the guide slot and the guide rail.

42. The mattress defect detection device according to embodiments 30-41, wherein the control housing is configured for automatically traversing the rail length of the guide rail.

43. The mattress defect detection device according to embodiments 30-42, wherein the control housing provides a motor in mechanical communication with the at least one wheel or roller provided by the guide slot, such that the motor causes the control housing to automatically traverse the guide rail.

44. The mattress defect detection device according to embodiments 30-43, wherein the control housing further provides a guide wand pivotally engaged with the control housing and configured for assisting with manually moving the control housing relative to the guide rail.

45. The mattress defect detection device according to embodiments 30-44, wherein the guide wand is telescoping, thereby allowing a wand length of the guide wand to be selectively adjusted.

46. The mattress defect detection device according to embodiments 30-45, wherein the guide wand is removably engageable with the control housing.

47. The mattress defect detection device according to embodiments 30-46, wherein the guide wand is permanently engaged with the control housing.

48. The mattress defect detection device according to embodiments 30-47, wherein the at least one measurement laser is positioned in a bottom surface of the control housing.

49. The mattress defect detection device according to embodiments 30-48, wherein the at least one measurement laser is a Class 2 CMOS laser.

50. The mattress defect detection device according to embodiments 30-49, wherein the control housing further provides a control display configured for displaying select data related to the mattress.

51. The mattress defect detection device according to embodiments 30-50, wherein the control housing further provides an at least one imaging device in electrical communication with the at least one microcontroller, the at least one imaging device positioned and configured for capturing at least one of a site photo and a site video of the at least one measurement site in tandem with the at least one measurement laser measuring the body depression of said at least one measurement site.

52. The mattress defect detection device according to embodiments 30-51, wherein the at least one imaging device is positioned in a bottom surface of the control housing.

53. The mattress defect detection device according to embodiments 30-52, wherein the control housing further provides a transceiver in electrical communication with the microcontroller and in remote communication with a computing device, thereby allowing the microcontroller to transmit to the computing device select data related to the mattress.

54. The mattress defect detection device according to embodiments 30-53, wherein the control housing further provides an at least one power source in electrical communication with at least one of the at least one measurement laser, imaging device, microcontroller and transceiver, and configured for selectively powering said components.

55. The mattress defect detection device according to embodiments 30-54, wherein the at least one power source is an at least one battery.

56. The mattress defect detection device according to embodiments 30-55, wherein the at least one power source is an AC power supply or a DC power supply.

57. The mattress defect detection device according to embodiments 30-56, further comprising an at least one carrying case configured for storing the various components of the mattress defect detection device in a disassembled state.

58. A method for analyzing a mattress for potential defects using the mattress defect detection system of claim 1, the method comprising the steps of: (a) positioning the guide rail a substantially uniform distance over the top surface of the mattress, such that the guide rail is oriented laterally or longitudinally relative to the mattress, in a substantially horizontal orientation and parallel with a top surface of the mattress; (b) further positioning the guide rail proximal to a first terminal edge of the mattress; (c) slidably positioning the control housing on the guide rail substantially at the first terminal end of the guide rail; (d) obtaining, via the at least one measurement laser, a depression depth of the body depression of the current measurement site; (e) transmitting the depression depth of the body depression of the current measurement site to the at least one computing device; (f) determining, via the user application, whether the depression depth of the body depression of the current measurement site exceeds a pre-defined threshold; (g) upon the user application determining that the depression depth of the body depression of the current measurement site exceeds a pre-defined threshold, the user application determining that the mattress is defective; (h) slidably moving the control housing along the guide rail toward the opposing second terminal end of the guide rail until a further measurement site is reached; (i) repeating steps (d)-(h) until the control housing reaches the opposing second terminal end of the guide rail; (j) incrementally moving the guide rail toward an opposing second terminal edge of the mattress; and (k) repeating steps (c)-(j) until the guide rail reaches the opposing second terminal edge of the mattress.

59. The method according to embodiment 58, further comprising the step of adjusting the rail length of the guide rail to be equal to or greater than a width or a length of the mattress.

60. The method according to embodiments 58-59, wherein the step of slidably positioning the control housing on the guide rail substantially at the first terminal end of the guide rail, further comprises the step of calibrating the at least one measurement laser.

61. The method according to embodiments 58-60, wherein the step of determining, via the user application, whether the depression depth of the body depression of the current measurement site exceeds a pre-defined threshold, further comprises the step of determining, via the user application, whether the depression depth of the body depression of the current measurement site is greater than or equal to 1.5 inches.

62. The method according to embodiments 58-61, further comprising the step of generating, via the user application, a detailed report that includes the depression depth of the body depression of each measurement site of the mattress obtained by the at least one measurement laser.

In closing, regarding the exemplary embodiments of the present invention as shown and described herein, it will be appreciated that a system and associated methods are disclosed and configured for detecting defects in mattresses. Because the principles of the invention may be practiced in a number of configurations beyond those shown and described, it is to be understood that the invention is not in any way limited by the exemplary embodiments, but is generally directed to a mattress defect detection system and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the terms "about" and "approximately." As used herein, the terms "about" and "approximately" mean that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art, or at least encompassing a range of plus or minus ten percent above and below the value of the stated characteristic, item, quantity, parameter, property, or term.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators-such as "first," "second," "third," etc.— for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of" As such, embodiments described herein or so claimed with the phrase "comprising" are expressly or inherently unambiguously described, enabled and supported herein for the phrases "consisting essentially of" and "consisting of."

Any claims intended to be treated under 35 U.S.C. § 112(f) will begin with the words "means for," but use of the term "for" in any other context is not intended to invoke treatment under 35 U.S.C. § 112(f). Accordingly, Applicant reserves the right to pursue additional claims after filing this application, in either this application or in a continuing application.

It should be understood that any logic code, programs, modules, processes, and/or methods disclosed herein, along with the order in which the respective elements of any such method are performed, are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment. Additionally, the various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The phrase "non-transitory," in addition to having its ordinary meaning, as used in this document means "enduring or long-lived." The phrase "non-transitory computer readable medium," in addition to having its ordinary meaning, includes any and all computer readable mediums, with the sole exception of a transitory, propagating signal. This includes, by way of example and not limitation, non-transitory computer-readable mediums such as register memory, processor cache and random-access memory ("RAM").

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

All of the material in this patent document issue subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. A mattress defect detection system for analyzing a mattress for potential defects in the nature of an at least one depression in a top surface of the mattress, namely, a sunken area in the top surface of the mattress at a location where no physical object is actively present nor positioned directly in contact with the top surface of the mattress, the system comprising:

an at least one mattress defect detection device comprising:

an elongate guide rail sized and configured for being oriented laterally or longitudinally relative to the mattress, in a substantially horizontal orientation and parallel with the top surface of the mattress;

a pair of support legs configured for engagement with the guide rail in order to elevate the guide rail a substantially uniform distance above the top surface of the mattress, thereby vertically spacing apart the guide rail and the top surface of the mattress;

each of the support legs providing a support foot configured for being placed on a substantially horizontal surface; and a control housing slidably engaged with the guide rail, so as to be vertically spaced apart from the top surface of the mattress, and capable of selectively traversing a rail length of the guide rail between a first terminal end and an opposing second terminal end of the guide rail, the control housing providing:

an at least one measurement laser positioned and configured for measuring a depression depth of the at least one depression in the top surface of the mattress—namely, a distance between the at least one measurement laser and the top surface of the mattress—at an at least one measurement site, the at least one measurement laser oriented so as to emit a laser beam toward the top surface of the mattress in a direction that is perpendicular to the top surface of the mattress; and an at least one microcontroller in electrical communication with the at least one measurement laser for controlling the at least one measurement laser and receiving from the at least one measurement laser the depression depth associated with each of the at least one measurement site; and a user application residing in memory on an at least one computing device, the at least one computing device in selective communication with the at least one mattress defect detection device and configured for receiving and processing the depression depth associated with each of the at least one measurement site, obtained by the at least one mattress defect detection device;

whereby, during use of the system, with the guide rail positioned over the top surface of the mattress, the control housing is moved along the guide rail between the first and second terminal ends, while the at least one measurement laser measures the depression depth of the at least one depression in the top surface of the mattress at each of the at least one measurement site, with each said depression depth measurement being subsequently transmitted to the at least one computing device, where the user application determines whether one or more of the at least one depression has a depression depth that exceeds a pre-defined threshold, in which case the user application determines that the mattress is defective; and whereby, during use of the system, the guide rail is positioned proximal to a first terminal edge of the mattress and incrementally moved toward an opposing second terminal edge of the mattress, with the control housing slidably moved along the guide rail from the first terminal end to the opposing second terminal end each time the guide rail is incrementally moved closer to the second terminal edge of the mattress.

2. The mattress defect detection system of claim 1, wherein the guide rail is selectively lengthwise adjustable, thereby allowing the rail length of the guide rail to be selectively sized in order accommodate a width or a length of the mattress.

3. The mattress defect detection system of claim 2, wherein the guide rail is selectively modular and comprises an elongate primary rail and an at least one elongate rail extension configured for removable engagement with a terminal end of the primary rail so as to selectively increase the rail length.

4. The mattress defect detection system of claim 1, wherein the support legs are engaged with the first and second terminal ends of the guide rail.

5. The mattress defect detection system of claim 1, wherein the control housing provides a guide slot through which the guide rail extends, thereby allowing the control housing to slidably traverse the guide rail.

6. The mattress defect detection system of claim 1, wherein the control housing further provides a guide wand pivotally engaged with the control housing and configured for assisting with manually moving the control housing relative to the guide rail.

7. The mattress defect detection system of claim 1, wherein the at least one measurement laser is a Class 2 CMOS laser.

8. The mattress defect detection system of claim 1, wherein the control housing further provides a control display configured for displaying select data related to the mattress.

9. The mattress defect detection system of claim 1, wherein the control housing further provides an at least one imaging device in electrical communication with the at least one microcontroller, the at least one imaging device positioned and configured for capturing at least one of a site photo and a site video of the at least one measurement site in tandem with the at least one measurement laser measuring the at least one depression of said at least one measurement site.

10. The mattress defect detection system of claim 1, wherein the control housing further provides a transceiver in electrical communication with the microcontroller and in remote communication with the computing device, thereby allowing the microcontroller to transmit to the computing device select data related to the mattress.

11. A mattress defect detection system for analyzing a mattress for potential defects in the nature of an at least one depression in a top surface of the mattress, namely, a sunken area in the top surface of the mattress at a location where no physical object is actively present nor positioned directly in contact with the top surface of the mattress, the system comprising:

an elongate guide rail sized and configured for being oriented laterally or longitudinally relative to the mattress, in a substantially horizontal orientation and parallel with the top surface of the mattress;

a pair of support legs configured for engagement with the guide rail in order to elevate the guide rail a substantially uniform distance above the top surface of the mattress, thereby vertically spacing apart the guide rail and the top surface of the mattress;

each of the support legs providing a support foot configured for being placed on a substantially horizontal surface; and a control housing slidably engaged with the guide rail, so as to be vertically spaced apart from the top surface of the mattress, and capable of selectively traversing a rail length of the guide rail between a first terminal end and an opposing second terminal end of the guide rail, the control housing providing:

an at least one measurement laser positioned and configured for measuring a depression depth of the at least one depression in the top surface of the mattress—namely, a distance between the at least one measurement laser and the top surface of the mattress—at an at least one measurement site, the at least one measurement laser oriented so as to emit a laser beam toward the top surface of the mattress in a direction that is perpendicular to the top surface of the mattress; and an at least one microcontroller in electrical communication with the at least one measurement laser for controlling the at least one measurement laser and receiving from the at least one measurement laser the depression depth associated with each of the at least one measurement site;

whereby, during use of the system, with the guide rail positioned over the top surface of the mattress, the control housing is moved along the guide rail between the first and second terminal ends, while the at least one measurement laser measures the depression depth of the at least one depression in the top surface of the mattress at each of the at least one measurement site; and whereby, during use of the system, the guide rail is positioned proximal to a first terminal edge of the mattress and incrementally moved toward an opposing second terminal edge of the mattress, with the control housing slidably moved along the guide rail from the first terminal end to the opposing second terminal end each time the guide rail is incrementally moved closer to the second terminal edge of the mattress.

12. The mattress defect detection device of claim 11, wherein the guide rail is selectively lengthwise adjustable, thereby allowing the rail length of the guide rail to be selectively sized in order accommodate a width or a length of the mattress.

13. The mattress defect detection device of claim 11, wherein the guide rail is selectively modular and comprises an elongate primary rail and an at least one elongate rail extension configured for removable engagement with a terminal end of the primary rail so as to selectively increase the rail length.

14. The mattress defect detection device of claim 11, wherein the support legs are engaged with the first and second terminal ends of the guide rail.

15. The mattress defect detection device of claim 11, wherein the control housing provides a guide slot through which the guide rail extends, thereby allowing the control housing to slidably traverse the guide rail.

16. The mattress defect detection device of claim 11, wherein the control housing further provides a guide wand pivotally engaged with the control housing and configured for assisting with manually moving the control housing relative to the guide rail.

17. The mattress defect detection device of claim 11, wherein the at least one measurement laser is a Class 2 CMOS laser.

18. The mattress defect detection device of claim 11, wherein the control housing further provides a control display configured for displaying select data related to the mattress.

19. The mattress defect detection device of claim 11, wherein the control housing further provides an at least one imaging device in electrical communication with the at least one microcontroller, the at least one imaging device positioned and configured for capturing at least one of a site photo and a site video of the at least one measurement site in tandem with the at least one measurement laser measuring the at least one depression of said at least one measurement site.

20. A method for analyzing a mattress for potential defects in the nature of an at least one depression in a top surface of the mattress, namely, a sunken area in the top surface of the mattress at a location where no physical object is actively present nor positioned directly in contact with the top surface of the mattress, using the mattress defect detection system of claim 1, the method comprising the steps of:

(a) positioning the guide rail a substantially uniform distance over the top surface of the mattress, such that the guide rail is oriented laterally or longitudinally relative to the mattress, in a substantially horizontal orientation and parallel with a top surface of the mattress;

(b) further positioning the guide rail proximal to a first terminal edge of the mattress;

(c) slidably positioning the control housing on the guide rail substantially at the first terminal end of the guide rail;

(d) obtaining, via the at least one measurement laser, a depression depth of the at least one depression of the current measurement site;

(e) transmitting the depression depth of the at least one depression of the current measurement site to the at least one computing device;

(f) determining, via the user application, whether the depression depth of the at least one depression of the current measurement site exceeds a pre-defined threshold;

(g) upon the user application determining that the depression depth of the at least one depression of the current measurement site exceeds a pre-defined threshold, the user application determining that the mattress is defective;

(h) slidably moving the control housing along the guide rail toward the opposing second terminal end of the guide rail until a further measurement site is reached;

(i) repeating steps (d)-(h) until the control housing reaches the opposing second terminal end of the guide rail;

(j) incrementally moving the guide rail toward an opposing second terminal edge of the mattress; and (k) repeating steps (c)-(j) until the guide rail reaches the opposing second terminal edge of the mattress.

\* \* \* \* \*